UNITED STATES PATENT OFFICE.

HEINRICH CARL BUER, OF BONN, GERMANY.

PROCESS FOR THE EXTRACTION OF LECITHIN FROM THE SEEDS OF LUPINES AND OTHER PULSES.

1,001,247.

Specification of Letters Patent. Patented Aug. 22, 1911.

No Drawing. Application filed March 25, 1909. Serial No. 485,784.

*To all whom it may concern:*

Be it known that I, HEINRICH CARL BUER, chemist, a subject of the German Emperor, and resident of Bonn-on-the-Rhine, Germany, have invented an Improved Process for the Extraction of Lecithin from the Seeds of Lupines and other Pulses, of which the following is a specification.

The subject of the present invention is an improved process for the extraction of lecithin, from the seeds of lupines and other pulses and consists in cooking shelled and dried seeds in alcohol of 96% strength, the extract so obtained being then evaporated to 30–50% of its weight, so that the proportion of alcohol is four or five times as great as that of the extractives contained in the extract, whereupon the strength of said alcohol is reduced to 80–85% strength by the addition of water. The solution is then allowed to stand for some time and a swollen gelatinous deposit forms in the solution which contains the bitter principles in a state of solution. The gelatinous. deposit is now briskly stirred in cold alcohol at 96%, so that any traces of fat, or bitter properties, which remain, are dissolved in this alcohol, leaving the pure lecithin undissolved.

The process is based on the fact that the bitter principles are more soluble in alcohol than is the lecithin, so that when the seeds of the pulses are being cooked in alcohol of 96% strength, the bitter principles dissolve first and only after continued cooking does the lecithin pass into solution. For this reason alcohol of 96% strength must be used, for if a weaker spirit of say 75–85% strength were used the bitter properties would dissolve, but only a very little lecithin would pass into the solution, since the dissolving powers of such an alcohol are correspondingly weaker. The latter portion of the process is based on the difference of solubility and by this means the lecithin is separated from the bitter properties through supresaturation of the extract obtained by cooking the seeds of pulses, in alcohol; the supersaturation being obtained by cooking the seeds in alcohol, then reducing the said extract to the extent of 30–50% by evaporation, so that the alcohol constitutes 4 or 5 times the quantity of extractives contained in the solution. Now as the lecithin is less soluble in alcohol than the bitter principles are, if the solution is allowed to stand for 24 hours, the bitter principles still remain dissolved therein, while the lecithin falls to the bottom as a gelatinous deposit.

In order to separate the lecithin from the bitter principles as completely as possible, the alcohol extract, which has been reduced as stated to an extent of 30–50% by evaporation, is now diluted to 80–85% strength by the addition of water, thus reducing the dissolving powers of the alcohol and facilitating the separation of the lecithin from the bitter principles. After standing for 24 hours, the lecithin settles in the form of a gelatinous deposit, which, after the solution containing the bitter principles has been drawn off, only contains a very small quantity of fat and bitter principles. Any remaining traces of these latter are easily removed by thoroughly washing and stirring the deposit of lecithin in cold alcohol of 96% strength. As the said deposit is in a swollen gelatinous state, the alcohol easily penetrates to every part thereof without dissolving any appreciable quantity of the said gelatinous deposit. If the alcohol containing the remaining traces of bitter principles and fat be now poured off, the deposit of lecithin assumes a firm wax like consistency, so that a further washing in alcohol has no effect on the deposit of lecithin, while the washing with alcohol of 96% strength has removed all traces of bitter principles and fat. After pouring off the last solution the lecithin is left behind free from the aforesaid principles.

The process herein described differs essentially from that of the German Patent No. 200,253, corresponding to United States application No. 437,871, in the following features: (1.) In the latter process the alcohol extract is concentrated by evaporation to the consistency of syrup, while in the former it is only concentrated by evaporation to the extent of from 30 to 50%. (2.) In the process of this application the lecithin is separated from the other principles by supersaturation, directly from the extract obtained by cooking the seeds in alcohol; whereas in the German Patent 200,253, the lecithin is separated by dissolving the syrup-like extract in a solution of alcohol, water and ether.

In this new process alcohol alone is used whereas in the process detailed in German Patent 200,253 use is made of a second solution, namely a mixture of alcohol water and ether, for the purpose of separating the lecithin. This latter process is subject to the great drawback that the alcohol and ether can only be separated and removed with the greatest difficulty, involving a great loss of alcohol and ether. On the other hand in this new process alcohol alone is used, and as the said alcohol does not become mixed with any other fluid except water and extractives, it can easily be recovered without loss. Therefore this new process is considerably cheaper and infinitely simpler than that described in German Patent No. 200,253. In the new process the lecithin obtained is much purer, while in the process according to German Patent No. 200,253 or United States application No. 437,871 much of the lecithin is lost as the separation of this latter is less perfect than in the new process.

The following is given as an example of the way in which the process is carried out in practice: 100 kilograms of dried and shelled lupine seeds, or peas, are cooked in about 150–200 liters of 96% alcohol in a suitable reflux apparatus for 3 to 4 hours. The extract obtained is then concentrated, by evaporation to an extent of 30–50% and the strength of the spirit lowered to 85% by the addition of water. The whole is then left to stand for 24 hours, at the end of which time the lecithin will have settled at the bottom in a gelatinous deposit. After pouring off the remaining fluid the residue of gelatinous lecithin is washed by thoroughly permeating it with cold alcohol of 96% strength; it is then merely necessary to pour off this fluid and the pure lecithin alone remains. By this process about $\frac{3}{4}$ of a kilogram of pure lecithin is obtained from 100 kilograms of peas, while about 1–1$\frac{1}{2}$ kilograms of pure lecithin are obtained from 100 kilograms of lupines.

Having fully described my invention, what I claim and desire to secure by Letters Patent is:—

A process for extracting lecithin from pulses, said process comprising the addition to 100 kilograms of shelled and dried pulse seeds of from 150 to 200 liters of 96% alcohol, cooking said seeds in said alcohol for 3 to 4 hours, separating and concentrating the resulting extract to from 30 to 50% of its original volume, adding water to said extract to reduce the strength of the alcohol contained therein to 85%, permitting this diluted extract to stand in order that lecithin may settle therefrom, decanting, washing the separated lecithin with 96% alcohol to remove all bitter principles and fatty substances therefrom, obtaining thereby a deposit of lecithin of wax-like consistency substantially pure.

In testimony whereof I have hereunto set my hand in the presence of two subscribing witnesses.

HEINRICH CARL BUER.

Witnesses:
 LOUIS VANDORN,
 BESSIE F. DUNLAP.